United States Patent
Hayden et al.

(10) Patent No.: US 11,697,927 B2
(45) Date of Patent: Jul. 11, 2023

(54) VALVE ASSEMBLIES FOR LEAK PREVENTION

(71) Applicant: Rheem Manufacturing Company, Atlanta, GA (US)

(72) Inventors: Christopher M. Hayden, Shelton, CT (US); Harsha Satyanarayana, Bristol, CT (US); Raymond Ytuarte, Seymour, CT (US)

(73) Assignee: Rheem Manufacturing Company, Atlanta, GA (US)

( * ) Notice: Subject to any disclaimer, the term of this patent is extended or adjusted under 35 U.S.C. 154(b) by 0 days.

(21) Appl. No.: 16/883,020

(22) Filed: May 26, 2020

(65) Prior Publication Data
US 2021/0372093 A1    Dec. 2, 2021

(51) Int. Cl.
| | | |
|---|---|---|
| E03B 7/07 | (2006.01) | |
| F16K 17/36 | (2006.01) | |
| F24H 15/12 | (2022.01) | |
| F16K 31/00 | (2006.01) | |
| F24H 9/13 | (2022.01) | |
| F24H 9/17 | (2022.01) | |

(52) U.S. Cl.
CPC ............... *E03B 7/071* (2013.01); *F16K 17/36* (2013.01); *F16K 31/001* (2013.01); *F24H 9/133* (2022.01); *F24H 9/17* (2022.01); *F24H 15/12* (2022.01)

(58) Field of Classification Search
CPC ........ E03B 7/071; F16K 17/36; F16K 31/001; F24H 9/133; F24H 9/17; F24H 15/12
USPC ..... 137/463, 312, 67, 68.11; 251/67, 73, 74; 122/504, 507, 14.3
See application file for complete search history.

(56) References Cited

U.S. PATENT DOCUMENTS

| | | | | |
|---|---|---|---|---|
| 1,497,946 A | * | 6/1924 | Schmidt ............... | F16K 17/383 137/77 |
| 2,798,503 A | * | 7/1957 | Carver .................... | F24H 9/165 137/67 |
| 3,920,031 A | * | 11/1975 | Maxfield ............... | F24H 9/2007 137/67 |
| 4,381,710 A | * | 5/1983 | Watterback ............... | F42C 3/00 102/200 |
| 4,944,253 A | * | 7/1990 | Bellofatto ............... | F24H 9/165 122/14.21 |
| 5,188,143 A | * | 2/1993 | Krebs ..................... | F24H 9/165 122/13.01 |

(Continued)

FOREIGN PATENT DOCUMENTS

| | | | | |
|---|---|---|---|---|
| WO | WO-2018020381 A | * | 2/2018 | ........... F16K 31/001 |

*Primary Examiner* — Minh Q Le
(74) *Attorney, Agent, or Firm* — Eversheds Sutherland (US) LLP

(57) ABSTRACT

The disclosed technology includes a non-powered valve assembly having a valve, an actuating system, and a trigger. The trigger can be in mechanical communication with the actuating system and the actuating system can be in mechanical communication with the valve. The trigger can be positioned such that the trigger can interact with liquid resulting from a leak in a plumbing assembly. Upon interaction with liquid, the trigger can dissolve or expand, causing the actuating system to be activated and the valve to transition from the open position to a closed position. In the closed position, the valve can restrict the passage of liquid through the plumbing assembly such that the leak can be mitigated.

17 Claims, 13 Drawing Sheets

(56) References Cited

U.S. PATENT DOCUMENTS

| | | | | |
|---|---|---|---|---|
| 5,632,302 | A * | 5/1997 | Lenoir, Jr. | F16K 31/02 137/312 |
| 5,771,916 | A * | 6/1998 | Armenia | D06F 39/081 137/67 |
| 6,024,116 | A * | 2/2000 | Almberg | F24H 9/2007 137/312 |
| 6,206,337 | B1 * | 3/2001 | Veillet, Jr. | F16K 31/06 137/78.1 |
| 6,792,967 | B1 * | 9/2004 | Franklin | F16K 17/042 122/504 |
| 6,899,122 | B1 * | 5/2005 | Mele | F16K 31/001 122/504 |
| 7,082,959 | B1 * | 8/2006 | Franklin | F16K 17/383 137/312 |
| 7,421,784 | B2 * | 9/2008 | Akkala | F24H 1/205 122/13.01 |
| 7,424,896 | B1 * | 9/2008 | Martin | F16K 31/001 122/504 |
| 7,562,673 | B1 * | 7/2009 | Martin | F16K 31/001 122/504 |
| 7,753,071 | B2 * | 7/2010 | Wood | G01M 3/16 137/558 |
| 8,006,714 | B1 * | 8/2011 | Martin | D06F 39/081 137/312 |
| 8,061,380 | B1 * | 11/2011 | Martin | F24H 9/165 137/312 |
| 8,371,325 | B1 * | 2/2013 | Grizzle | F16K 31/12 137/78.3 |
| 8,443,823 | B1 * | 5/2013 | Prager | F16K 17/40 137/68.11 |
| 9,964,222 | B1 * | 5/2018 | Jones | F16K 17/36 |
| 11,009,142 | B2 * | 5/2021 | Emory | F16K 31/084 |
| 2017/0121950 | A1 * | 5/2017 | Monk | A47L 15/421 |

\* cited by examiner

VALVE ASSEMBLIES FOR LEAK PREVENTION

FIELD OF THE DISCLOSURE

The present invention relates generally to a valve assemblies, and more particularly, to a valve assemblies capable of detecting and preventing or mitigating a water leak.

BACKGROUND

Residential homes and commercial entities can have various plumbing systems and devices capable of storing and handling water, including water heaters, washing machines, dishwashers, sinks, and the like. Failures of such systems and appliances can be a significant source of water loss and damage. For example, a crack of only one-eight inch diameter in a water vessel can result in a loss of water upwards of 250 gallons per day. Because of the significant damage and financial costs that can result from water leaks, it can be critical to quickly and effectively detect and stop a water leak.

One method of detecting and minimizing a water leak can include a powered valve. A powered valve can include one or more sensors configured to detect the presence of water from a leak. In response, the powered valve can send a signal to an actuator to close a valve. However, powered valves can present several disadvantages. For example, a water leak can sometimes result in the powered valve shorting. When this occurs, the powered valve can become inoperable due to its reliance on power. Additionally, a situation can arise in which power is unavailable, such as a power outage. When power is unavailable, the powered valve cannot automatic shut off a plumbing system or device in response to a leak. And while battery backups may be available, the inclusion of a battery backup requires a user to routinely ensure the battery backups are charged. Further, depending on the length of a power outage, the batter backups may themselves run out of charge.

And while some options of non-powered valve assemblies exist, these can typically cause a pressure drop (i.e., the pressure immediately downstream of the valve is lower than the pressure upstream of the valve) within the associated plumbing system. That is, the internal flow path of liquid through a plumbing system can determine the amount of pressure drop, and existing valve assemblies can obstruct the internal flow path of liquid, thereby increasing the magnitude of the plumbing system's pressure drop. To that end, existing valves typically focus on providing the shortest possible path to close the valve (i.e., minimizing the amount of linear motion needed to close the valve), but such designs generally obstruct a significant portion of the internal flow path of liquid, causing greater pressure drop of the liquid within the associated plumbing system. Accordingly, a need exists for systems, devices, and methods that can quickly and effectively detect and mitigate a water leak from a plumbing system or component without reliance on power. Further, there is also a need for systems, devices, and methods for detecting and mitigating a water leak while minimizing or eliminating any added pressure drop.

SUMMARY

These and other problems can be addressed by the technologies described herein. Examples of the present disclosure relate generally to a valve assembly for detecting and mitigating a water leak in a plumbing assembly without the use of power.

The disclosed technology includes a valve assembly including a valve, a trigger, and an actuating system. The valve can be configured to transition from an open position to a closed position. The open position can permit passage of liquid through a plumbing assembly. The closed position can restrict passage of liquid through the plumbing assembly. The trigger can be in mechanical communication with the actuating system and can be positioned such that the trigger can interact with liquid from a leak. When the trigger interacts with liquid from the leak, the trigger can transition from a dry state to a hydrated state. The actuating system can be in mechanical communication with the valve and the trigger. When the trigger transitions to the hydrated state, the actuating system can be activated, thereby causing the valve to transition from the open position to the closed position. Upon the valve closing, the leak can be mitigated by preventing continued flow of the liquid to the leak location.

The disclosed technology also includes a water heater including an inlet for receiving a flow of water, and the water heater can include a valve assembly in fluid communication with the inlet. The valve assembly can include a valve, a trigger, and an actuating system. The valve can be configured to transition from an open position to a closed position. The open position can permit the flow of water through the inlet pipe. The closed position can restrict the flow of water through the inlet pipe. The trigger can be in mechanical communication with the actuating system. The trigger can be positioned such that the trigger can interact with liquid indicating a leak. When the trigger interacts with liquid from a leak, the trigger can transition from a dry state to a hydrated state. The actuating system can be in mechanical communication with the valve and the trigger. When the trigger transitions to the hydrated state, the actuating system can be activated, causing the valve to transition from the open position to the closed position. Upon the valve closing, the leak can be mitigated.

These and other aspects of the present disclosure are described in the Detailed Description below and the accompanying figures. Other aspects and features of the present disclosure will become apparent to those of ordinary skill in the art upon reviewing the following description of specific examples of the present disclosure in concert with the figures. While features of the present disclosure may be discussed relative to certain examples and figures, all examples of the present disclosure can include one or more of the features discussed herein. Further, while one or more examples may be discussed as having certain advantageous features, one or more of such features may also be used with the various other examples of the disclosure discussed herein. In similar fashion, while examples may be discussed below as devices, systems, or methods, it is to be understood that such examples can be implemented in various devices, systems, and methods of the present disclosure.

BRIEF DESCRIPTION OF THE FIGURES

Reference will now be made to the accompanying figures, which are not necessarily drawn to scale, and wherein.

DETAILED DESCRIPTION

Figure 1A:
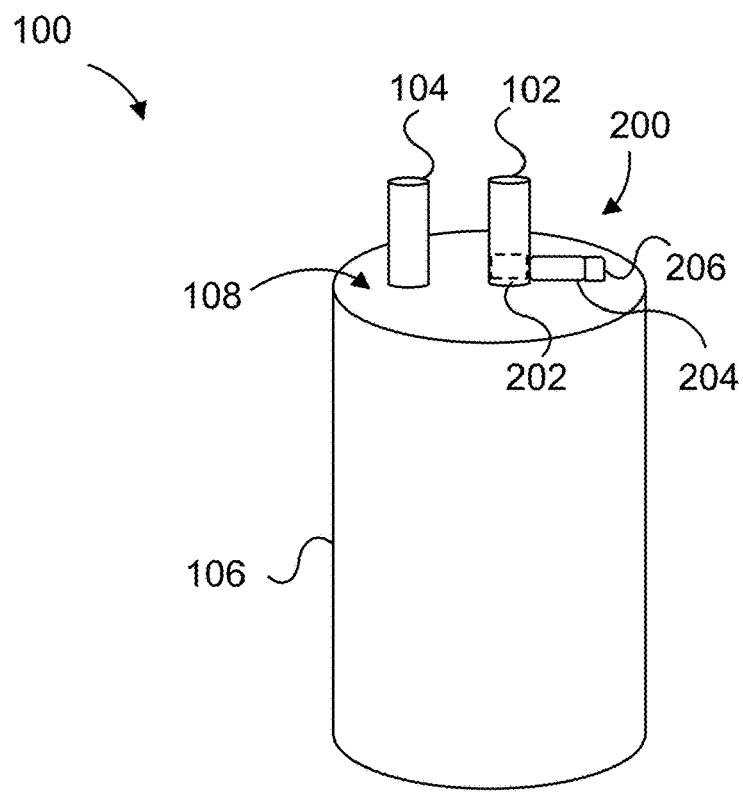
FIGS. 1A and 1B illustrate a fluid heating device in communication with a valve assembly, in accordance with the disclosed technology.

The disclosed technology relates to a non-powered valve assembly having a valve, an actuating system, and a trigger. The trigger can be in mechanical communication with the actuating system and the actuating system can be in mechanical communication with the valve. The trigger can be configured to maintain the valve in an open position during normal operation of a fluid heating device (or any fluid system, regardless of whether the fluid is heated) such that the passage of liquid through the fluid heating device can be unobstructed. When the fluid heating device begins to leak, liquid from the leak can accumulate near and/or on the fluid heating device. The trigger can be positioned such that the trigger can interact with the liquid. Upon interaction with liquid, the trigger can dissolve or expand. When the trigger dissolves or expands, the actuating system can be activated and cause the valve to transition from the open position to a closed position. In the closed position, the valve can restrict the passage of liquid through the fluid heating device such that the leak can be mitigated. By detecting and quickly stopping a leak using a non-powered valve, costly water damage can be minimized.

The disclosed technology will be described more fully hereinafter with reference to the accompanying drawings. This disclosed technology can, however, be embodied in many different forms and should not be construed as limited to the examples set forth herein. The components described hereinafter as making up various elements of the disclosed technology are intended to be illustrative and not restrictive. Such other components not described herein may include, but are not limited to, for example, components developed after development of the disclosed technology.

In the following description, numerous specific details are set forth. But it is to be understood that examples of the disclosed technology can be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," "one example,' "an example," "some examples," "certain examples," "various examples," etc., indicate that the embodiment(s) and/or example(s) of the disclosed technology so described may include a particular feature, structure, or characteristic, but not every embodiment necessarily includes the particular feature, structure, or characteristic. Further, repeated use of the phrase "in one embodiment" or the like does not necessarily refer to the same embodiment, example, or implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described should be in a given sequence, either temporally, spatially, in ranking, or in any other manner.

Unless otherwise specified, all ranges disclosed herein are inclusive of stated end points, as well as all intermediate values. By way of example, a range described as being "from approximately 2 to approximately 4" includes the values 2 and 4 and all intermediate values within the range. Likewise, the expression that a property "can be in a range from approximately 2 to approximately 4" (or "can be in a range from 2 to 4") means that the property can be approximately 2, can be approximately 4, or can be any value therebetween.

As used herein, the term "non-powered" refers to something that is not powered by electricity, motors, or the like. That is, a non-powered device or system can include one or more components configured to store energy (provided it does not include a motor and/or utilize electricity), such as stored mechanical energy. For example, a non-powered device can include a compressed spring storing potential energy (i.e., stored mechanical energy).

Figure 1B:
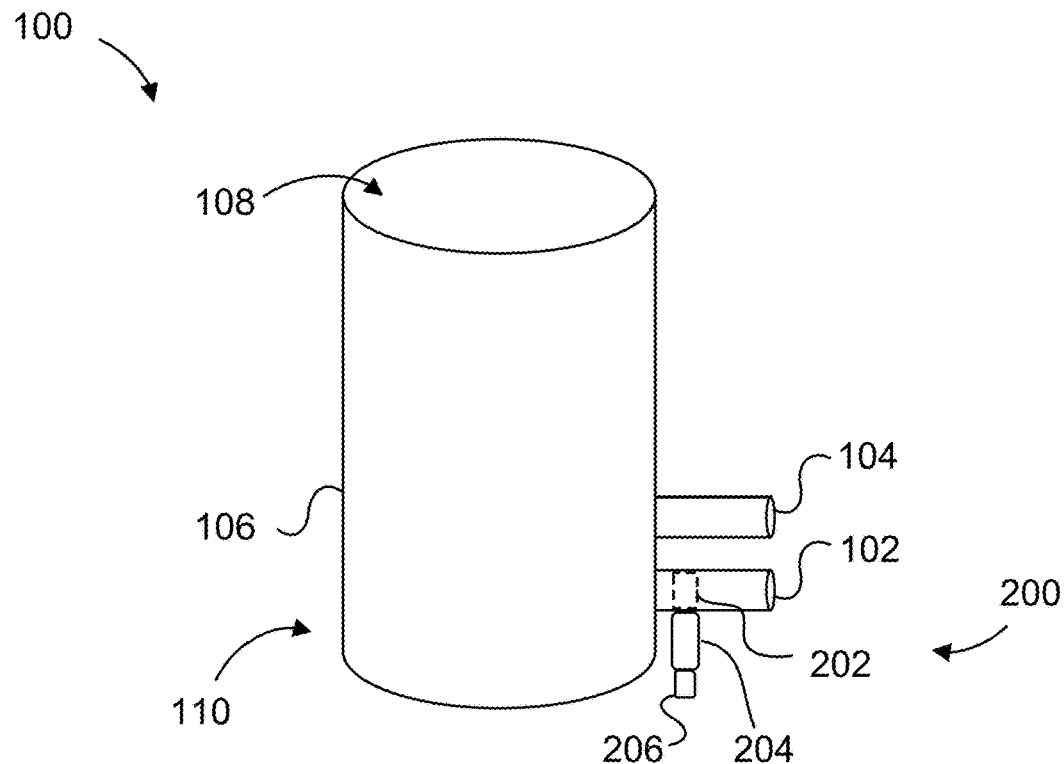

Referring now to the drawings, FIGS. 1A and 1B illustrate a fluid heating device 100 in communication with a valve assembly 200. The fluid heating device 100 can be of any type, including tank-based or tankless and can have any heat source, either gas, electric, or a combination thereof. Although FIGS. 1A and 1B illustrate a fluid heating device 100 in communication with the valve assembly 200, it is contemplated that the disclosed technology (e.g., the various disclosed valve assemblies) can be used in conjunction with any fluid system and is not limited to use with fluid heating devices or systems. The fluid heating device 100 can include an inlet pipe 102 for receiving a flow of water and an outlet pipe 104 for outputting a flow of water. The valve assembly 200 can be positioned at, on, or proximate the inlet pipe 102. Alternatively, the valve assembly can be positioned at, on, or proximate the outlet pipe 104. As illustrated in FIG. 1A, the inlet pipe 102 and the outlet pipe 104 can be disposed on a top surface 108 of the fluid heating device 100. The valve assembly 200 can be positioned on or proximate the top surface 108 of the fluid heating device 100. The valve assembly 200 can be positioned such that the valve assembly 200 intersects the inlet pipe 102 (e.g., at a ninety-degree angle). Alternatively, as illustrated in FIG. 1B, the inlet pipe 102 and the outlet pipe 104 can be disposed proximate a base 110 of the tank 106. The valve assembly 200 can be positioned at or proximate the base 110 of the tank 106. The valve assembly 200 can intersect the inlet pipe 102 (e.g., at a ninety-degree).

Figure 4A:
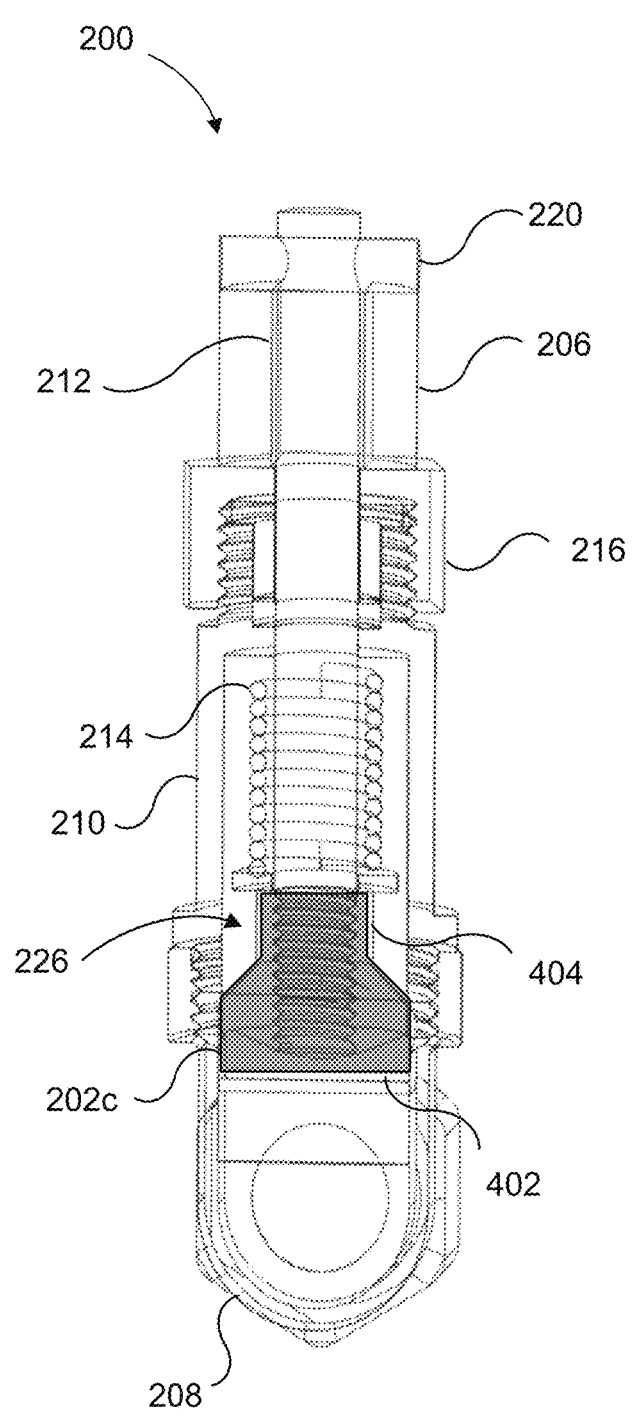
FIG. 4A illustrates a cross-sectional side view of an example valve assembly in an open position, in accordance with the disclosed technology.
Figure 4B:
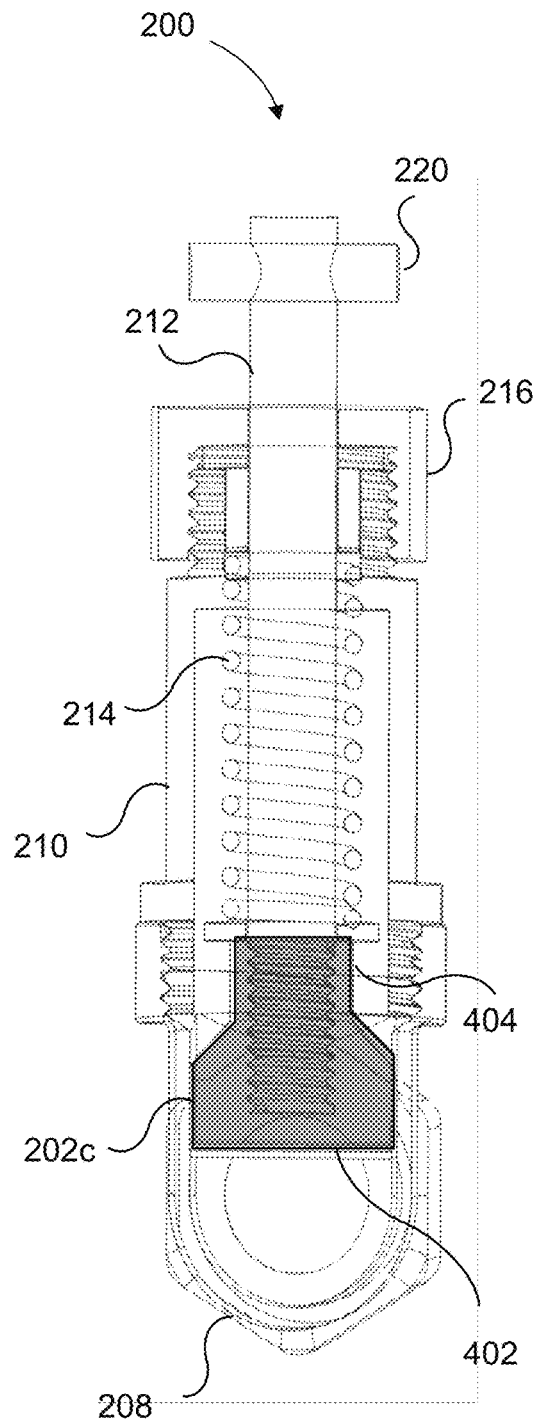
FIG. 4B illustrates a cross-sectional side view of the example valve assembly of FIG. 4A in a closed position, in accordance with the disclosed technology.
Figure 5:
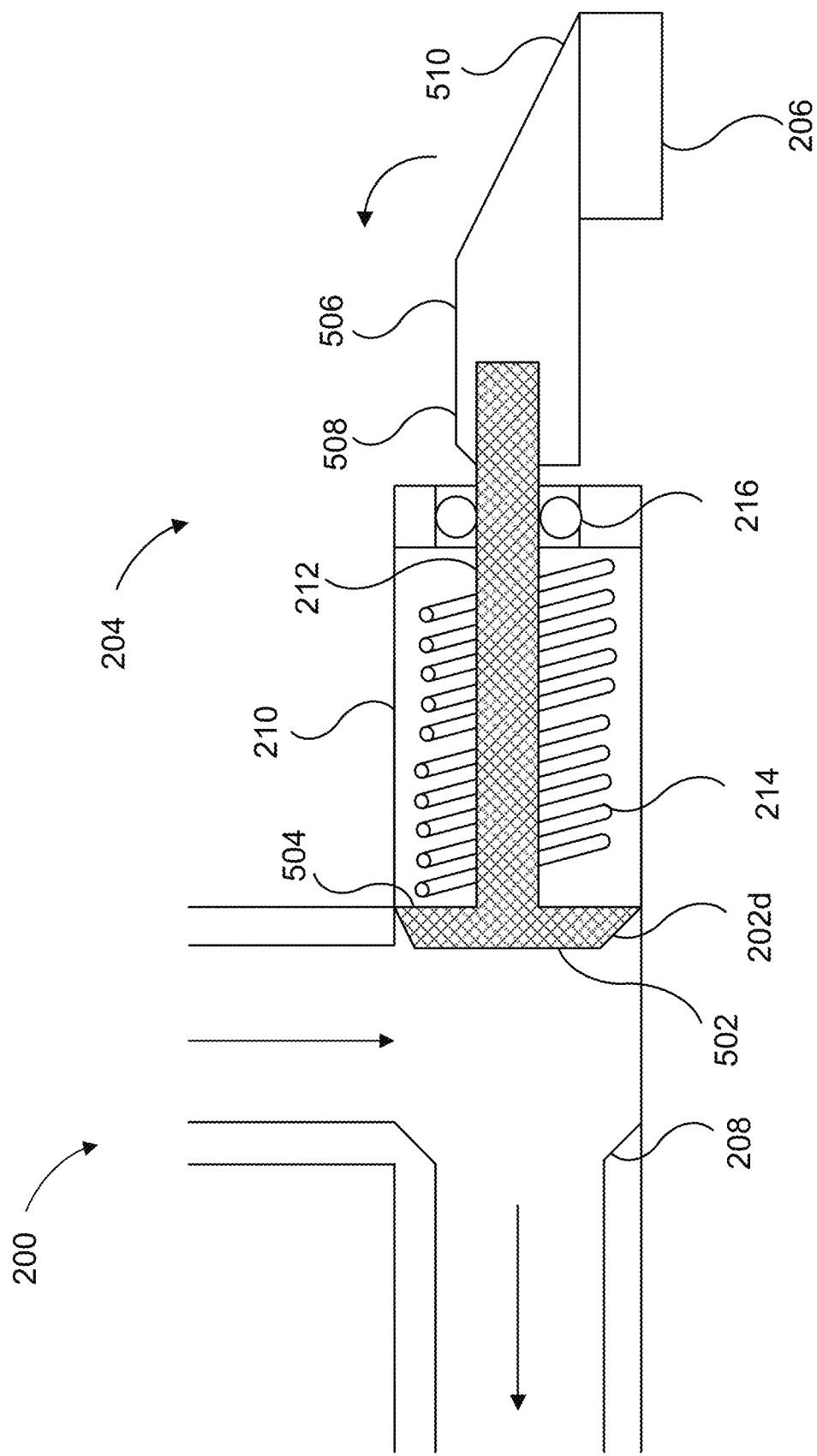
FIG. 5 illustrates cross-sectional view of an example valve assembly that includes an alternative example actuating system, in accordance with the disclosed technology.

The valve assembly 200 can include a valve 202, an actuating system 204, and a trigger 206. The valve 202 can be configured to transition from an open position to a closed position. In the open position, the valve 202 can permit unobstructed passage of water through the inlet pipe 102 and the valve 202. In the closed position, the passage of water through the inlet pipe 102 of the fluid heating device 100 can be at least partially restricted or blocked entirely by the valve 202. A variety of valves 202 can be used in conjunction with the valve assembly 200, including but not limited to, a gate valve 202a (e.g. as illustrated in FIGS. 2A-2F), a needle valve 202b (e.g. as illustrated in FIGS. 3A-3E, a partition valve 202c (e.g. as illustrated in FIGS. 4A and 4B), and a diaphragm valve 202d (e.g. as illustrated in FIG. 5).

The actuating system 204 can be in mechanical communication with the valve 202 and the trigger 206. The actuating system 204 can be configured to transition the valve 202 from the open position to the closed position upon becoming initiated by the trigger 206. The actuating system 204 can be configured to store energy to transition the valve 202. For example, the actuating system 204 can include a spring. The spring can be compressed to store mechanical energy, and the trigger 206 can be configured to hold the spring in the compressed position. Alternatively or in addition, the actuating system 204 can receive energy from the trigger 204 and transmit or otherwise provide energy to the valve 202 to close the valve 202 (e.g., if the trigger 204 includes an expandable material as described more fully herein).

The trigger 206 can be in mechanical communication with the actuating system 204. The trigger 206 can be positioned proximate the fluid heating device 100 such that the trigger 206 can interact with liquid that has leaked from the fluid heating device 100. As illustrated in FIG. 1A, the trigger 206 can be positioned on the top surface 108 of the fluid heating device 100 and proximate to the inlet pipe 102. As illustrated in FIG. 1B, the trigger 206 can be positioned proximate the base 110 of the fluid heating device 100 and proximate the inlet pipe 102. When the trigger 206 interacts with liquid from a leak in the fluid heating device 100, the trigger 206 can transition from a dry state to a hydrated state. The trigger 206 can be configured to initiate movement of the actuating system 204 in response to the trigger coming into contact with a liquid (e.g., liquid from a leak).

The trigger 206 can include liquid-soluble material. By way of example, the trigger 206 can include polyvinyl alcohol, calcium, salt, sugar, paper, or any other liquid-soluble material (or any material that can become softened by interaction of the material with a liquid, regardless of whether the material actually dissolves). The trigger 206 can be configured to at least partially dissolve and/or physically change upon coming into contact with a liquid. In some instances, the trigger 206 can be configured to dissolve entirely upon coming into contact with a liquid. In some instances, the trigger 206 can soften upon coming into contact with a liquid. Once the trigger 206 becomes sufficiently dissolved or sufficiently changes in physical form (e.g., softens), the trigger 206 can structurally fail, thereby initiating movement of the actuating system (e.g., releasing stored energy of the actuating system 204, such as a compressed spring of the actuating system 204). When the actuating system 204 is activated, the released store energy can cause the valve 202 to transition from the open position to the closed position.

Alternatively, the trigger 206 can include expandable material, including but not limited to polymeric material. The trigger 206 can thus be configured to expand in volume if the trigger 206 interacts with liquid, and the expansion of the trigger 206 can displace some or all of the actuating system 204 or otherwise cause the actuating system 204 to move. Once the trigger 206 sufficiently expands, the trigger 206 can provide the necessary force to initiate movement of the actuating system 204. By way of example, a component of the actuating system 204 (e.g. a lever) can be positioned in mechanical communication with the trigger 206 such that when the trigger 206 expands, the lever can rotate. When the lever rotates, the stored energy of the actuating system can be released, allowing the valve 202 to close.

Because the components of the valve assembly 200 are in mechanical communication with one another and because energy for transitioning the valve 202 from the open position to the closed position can be provided by mechanical energy storage device of the actuating system 204 or the trigger 206 itself, electrical communication and/or power is not needed. Accordingly, in instances where power is not available due to inadequate plumbing systems or a failed appliance or a temporary power outage occurs, if a fluid heating device 100 begins to leak, the valve 202 can still effectively and efficiently operate to mitigate and stop the leak.

In some instances, the actuating system 204 can be configured to transition a dry contact switch from an open state to a closed state when the actuating system 204 is activated upon detection of a potential leak in the fluid heating device 100. When the dry contact switch transitions to a closed state, electrical power to the fluid heating device can be disabled or otherwise disabled. In this configuration, interaction between leaked liquid and electricity from the power source of the fluid heating device 100 can be advantageously mitigated and/or prevented.

Although FIGS. 1A and 1B illustrate the valve assembly 200 associated with a fluid heating device 100, it is contemplated that the valve assembly 200 can be used with any fluid storage device and/or plumbing system.

FIGS. 2A through 2F illustrate an example valve assembly including a gate valve 202a. The valve assembly 200 can include the gate valve 202a, an actuating system 204, and a trigger 206. The valve 202a can be configured to transition from an open position to a closed position when the actuating system 204 becomes activated upon the trigger 206 transitioning to a hydrated state due to interaction with liquid from a leak in the fluid heating device 100.

Figure 2A:
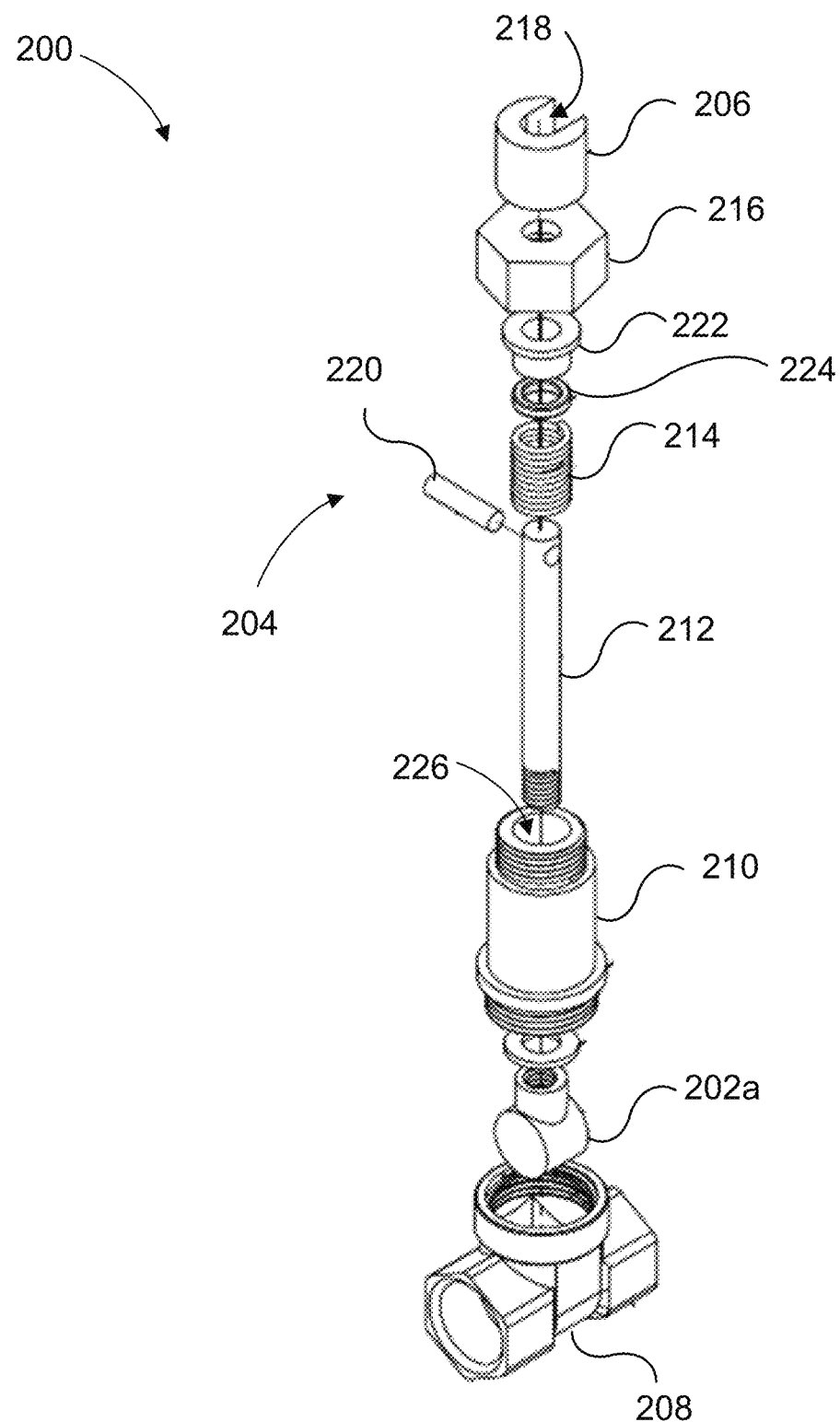
FIG. 2A illustrates an exploded view of an example valve assembly, in accordance with the disclosed technology.
Figure 2B:
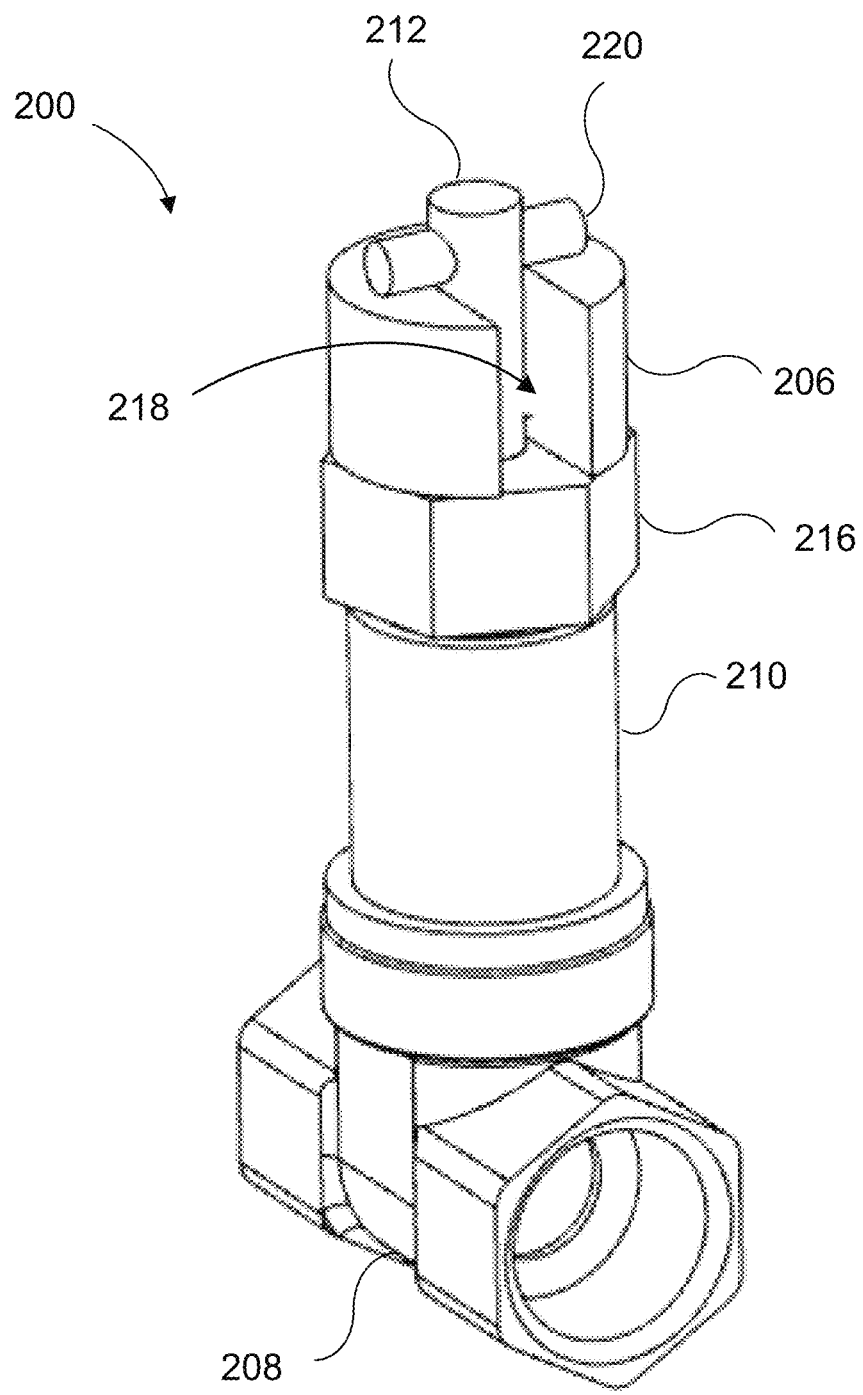
FIG. 2B illustrates an assembled view of the example valve assembly as illustrated in FIG. 2A, in accordance with the disclosed technology.

FIGS. 2A and 2B illustrate an exploded view and an assembled view, respectively, of the example valve assembly 200 including a gate valve 202a. The valve 202a can be configured to effectively restrict the passage of liquid through the fluid heating device 100 upon the detection of a leak. The valve 202a can have any shape, including but not limited to, cylindrical, spherical, rectangular prism, and the like. The valve 202a can have a cross-section of any shape, including circular, rectangular, polygonal, and the like. The shape and/or cross-section area of the valve 202a can correspond to the shape and/or cross-section area of the inlet pipe 102 or any pipe directing a passage of fluid through the fluid heating device 100. The cross-section of the valve 202a can have a diameter that is approximately the same as the diameter of the inlet pipe 102 or any pipe directing a passage of fluid through the fluid heating device 100. The valve 202a can be made of any material capable of effectively minimizing or preventing the passage of water. The valve 202a can be made of material including cast iron, carbon steel, stainless steel, cooper, plastic, or combinations thereof.

In the open position, the valve 202a can be disposed within the cavity 226 of the valve body 210. The valve 202a can be disposed within the cavity 226 such that the passage of liquid through the fluid heating device can be unobstructed. In the closed position, the valve 202a can be received into the seat 208. The seat 208 can be shaped such that the valve 202a can fit into the seat 208 and the passage of liquid can be substantially or entirely blocked.

The actuating system 204 can include a stem 212 extending from the valve 202a and a spring 214. The stem 212 can be integral to the valve 202a. Alternatively, the stem 212 can be a separate component that can be affixed to the valve 202a. The stem 212 can extend approximately the length of the valve body 210. The stem 212 can include an aperture disposed proximate at a first end. The aperture can be configured to receive a pin 220. The pin 220 can be a dowel pin. As illustrated in FIG. 2B, when the valve 202a is in an open position, the pin 220 can rest on a top surface of the trigger 206. The spring 214 can be in communication with the stem 212. The spring 214 can be wrapped or coiled around the stem 212. In some instances, the spring 214 can be wrapped or coiled around the entire length of the stem 212. Alternatively, the spring 214 can be wrapped or coiled around a portion of the length of the stem 212. The spring 214 can have a compressed configuration and an elongated configuration. Upon the presence of a leak and activation of the actuating system, the spring 214 can transition from the compressed configuration to the elongated configuration.

A seal 216 can be positioned proximate a top end of the valve body 210. The seal 216 can be a gland nut, bolt, or any device or mechanism capable of forming a seal. The seal 216 can be watertight. The seal 216 can include an aperture configured to receive the stem 212.

The valve assembly 200 can include a compression gland 222, an O-Ring 224, or any other device or mechanism capable of sealing the cavity 226. The seal 216, compression gland 222, and O-Ring 224 can be in communication with one another such that the components collectively provide a sufficient watertight seal.

When the valve 202a is in the open position, the trigger 206 can be positioned proximate the seal 216. The trigger 206 can be positioned on a top surface of the seal 216. The trigger 206 can include an opening 218 configured to receive the stem 212 such that the trigger 206 can be positioned in mechanical communication with the actuating system 204 without disassembling the valve assembly 200 or interfering with other components of the fluid heating device 100. As illustrated in FIGS. 2A and 2B, the opening 218 can be a slot sized to receive the stem 212. In some instances, the opening 216 can be an aperture sized to receive the stem 212. The trigger 206 can be positioned such that the trigger 206 can interact with the liquid from a leak.

Figure 2C:
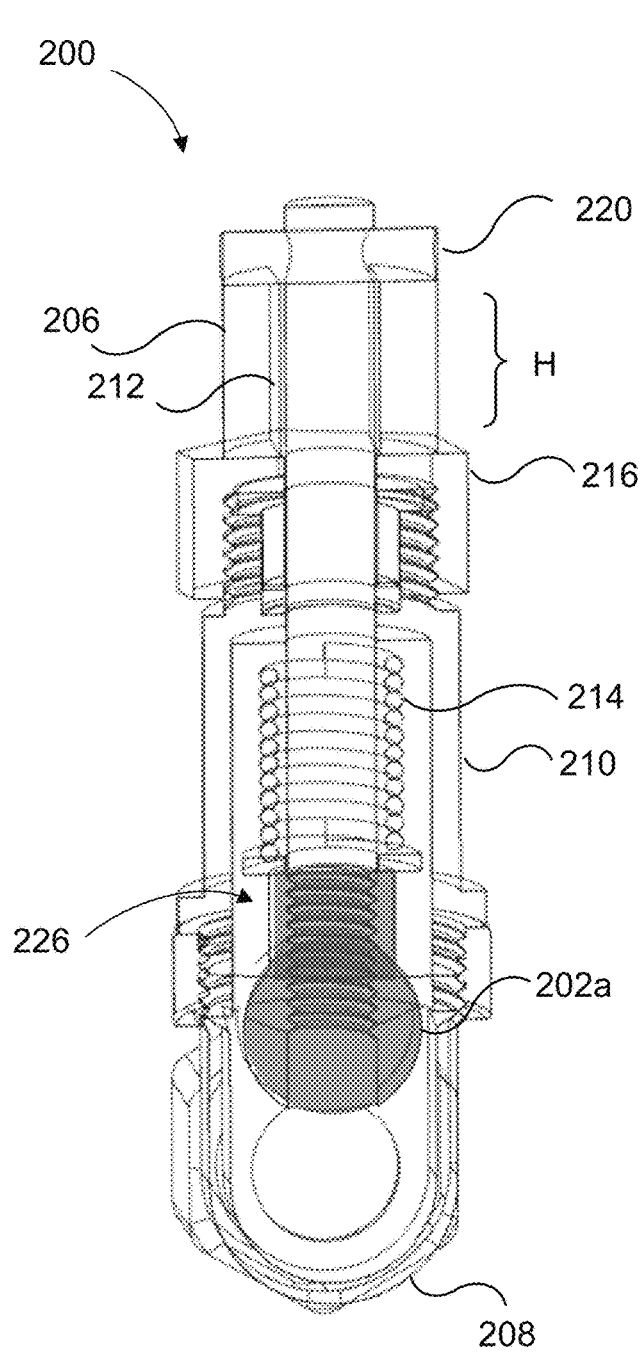
FIG. 2C illustrates a cross-sectional side view of the example valve assembly of FIGS. 2A and 2B in an open position, in accordance with the disclosed technology.
Figure 2D:
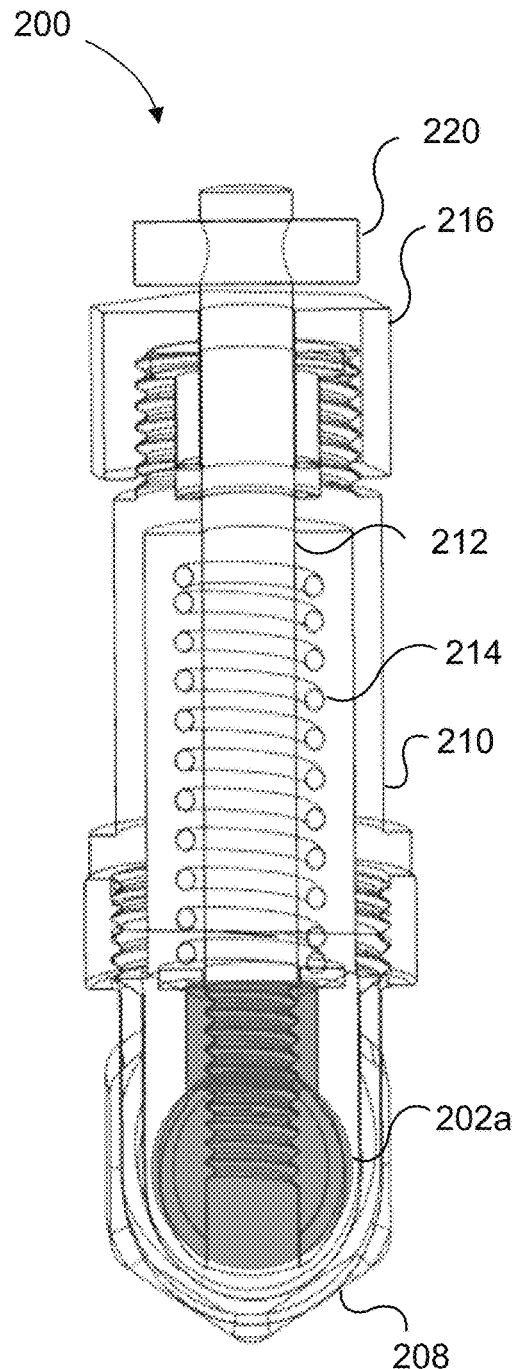
FIG. 2D illustrates a cross-sectional side view of the example valve assembly of FIGS. 2A and 2B in a closed position, in accordance with the disclosed technology.

FIGS. 2C and 2D illustrate a cross-sectional side view of the example valve assembly 200 including the valve 202a transitioning from an open position to a closed position. In the open position, the valve 202a can be disposed within the cavity 226 of the valve body 210. The valve 202a can be disposed within the cavity 226 such that the passage of water through the fluid heating device 100 can be unobstructed, resulting in minimal flow resistance. When the passage of water is unobstructed, the pressure drop associated with the valve 202a can be minimal. In the open position, the spring 214 wrapped or coiled around the stem 212 can be in the compressed configuration. When no leak is present, the trigger 206 can remain in the dry state and be positioned on top surface of the seal 216. The pin 220 resting on the top surface of the trigger 206 can effectively maintain the stem 212 and valve 202a in the open position. The presence of the trigger 206 can provide a visual indication that the valve 202a is not activated (e.g., the valve 202a is in the open position).

Upon interaction with liquid from a leak, the trigger 206 can at least partially dissolve and/or undergo sufficient physical change (e.g. soften) causing the actuating system 204 to be activated and the valve 202a to transition from the open position to the closed position. In some instances, the trigger 206 can begin to soften dissolve upon absorption of a first threshold volume of liquid. Optionally, the trigger 206 can dissolve entirely upon absorption of a second threshold volume of liquid. Upon the trigger 206 at least partially dissolving (e.g., softening) and/or physically changing, the trigger 206 can lose structural strength and/or structurally fail such that the actuating system 204 can become activated. As the trigger 206 structurally fails or loses structural integrity, the stem 212 can gradually (or suddenly, as the case may be) move in a linear motion within the cavity 226 towards the seat 208, and the spring 214 can gradually (or suddenly, as the case may be) move from the compressed configuration to the elongated configuration. The linear motion of the stem 212 and the released spring force resulting from the trigger 206 at least partially dissolving and/or physically changing can cause the valve 202a to gradually (or suddenly) move from the open position to the closed position.

In some instances, the stem 212 can move in a linear motion at substantially the same rate as the trigger 206 can dissolve and/or physically change. Thus, as the height H of the trigger 206 decreases, the stem 212 correspondingly moves linearly the same distance towards the seat 208. When the trigger 206 is completely dissolved, the trigger 206 can no longer hold the stem 212, and the valve 202a can subsequently close. Alternatively, the valve 202b can transition from an open position to a closed position upon the trigger 206 dissolving a threshold amount. In some instances, the actuating system 204 can be activated only upon the trigger 206 completely dissolving. In this configuration, the valve 202a can be closed immediately upon the trigger 206 completing dissolving. Additionally, the actuating system 204 can be activated upon the trigger 206 at least partially dissolving. By way of example, the trigger 206 can partially dissolve upon interaction with liquid, such that the height H of the trigger 206 can decrease a threshold amount. Once the trigger 206 has decreased in height H the threshold amount, the actuating system 204 can be activated and the gate 202 can be closed.

When the valve 202a transitions from the open position to the closed position, the seat 208 can receive the valve 202a.

The seat 208 can be shaped such that the bottom portion 208 can receive the valve 202a. As illustrated in FIG. 2D, when the valve 202a is substantially cylindrical, the seat 208 can be curved, such that the valve 202a can be appropriately received and the passage of water can be blocked.

Figure 2E:
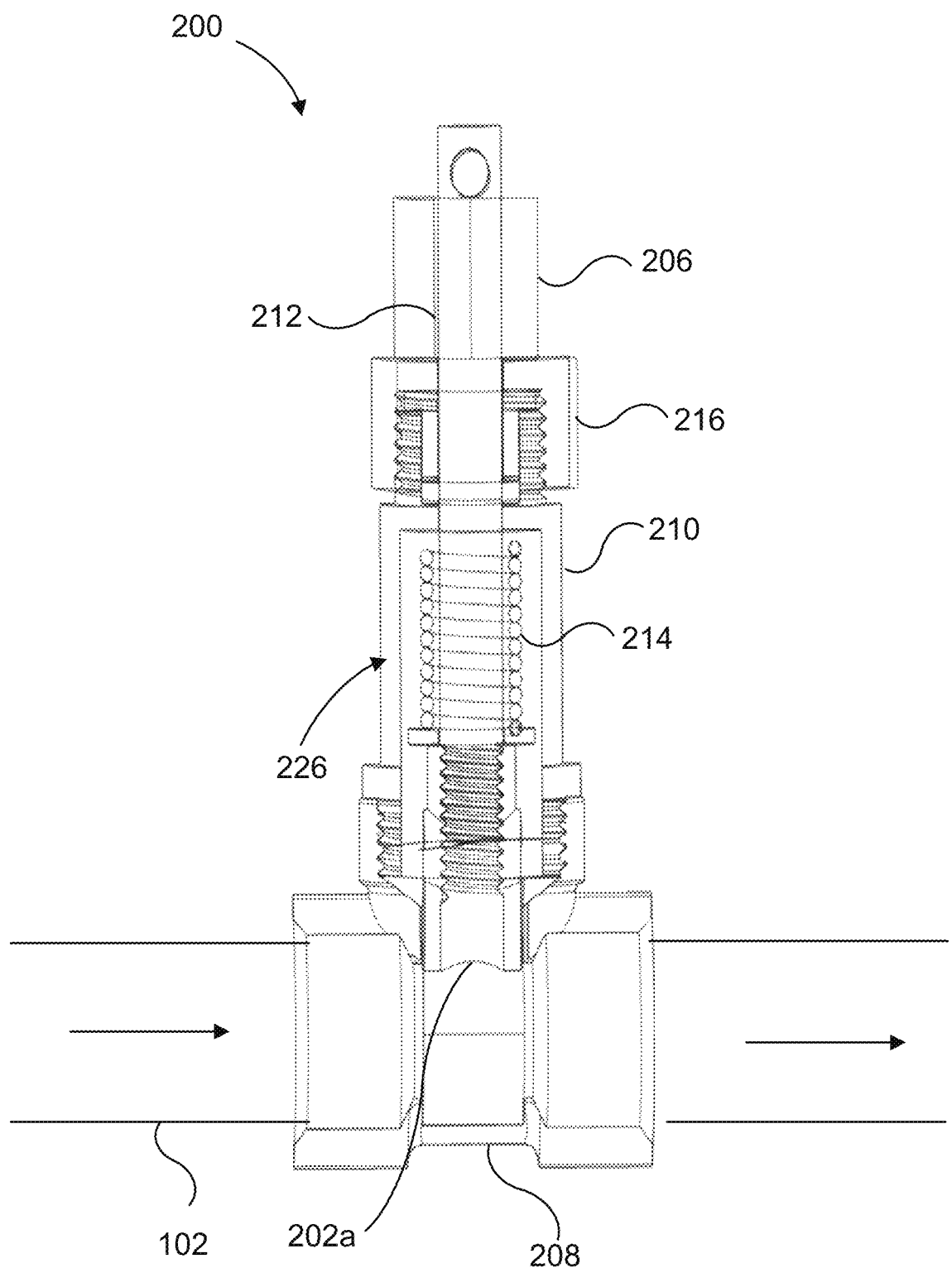
FIG. 2E illustrates a cross-sectional front view of the example valve assembly of FIGS. 2A and 2B in an open position, in accordance with the disclosed technology.
Figure 2F:
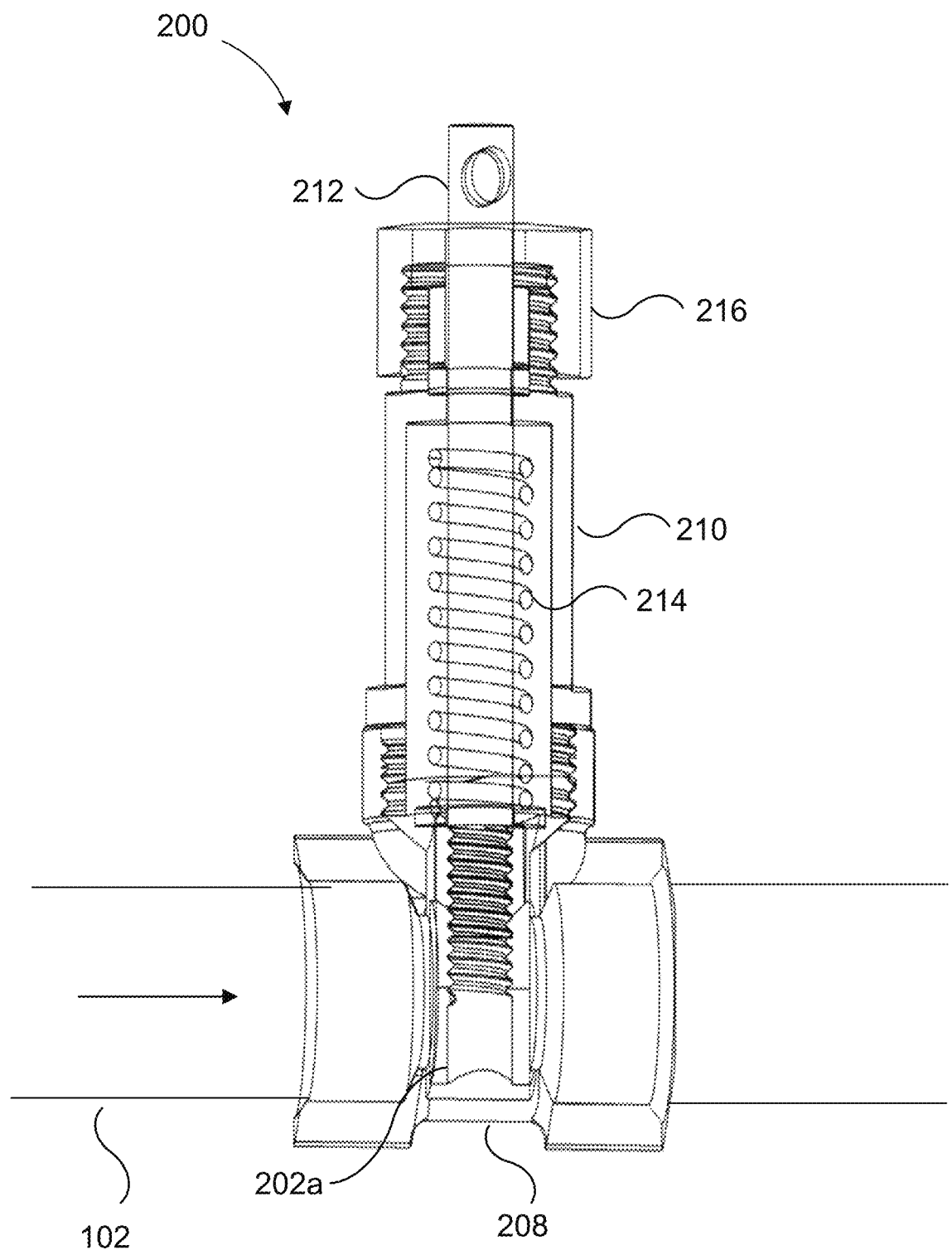
FIG. 2F illustrates a cross-sectional front view of the example valve assembly of FIGS. 2A and 2B in a closed position, in accordance with the disclosed technology.

FIGS. 2E and 2F illustrate a cross-sectional front view of the example valve assembly 200 including the valve 202a transitioning from an open position to a closed position. In the open position, the valve 202a is disposed within the cavity 226 of the valve body 210, such that the passage of water through the inlet pipe 102 can be unobstructed. By completely disposing the valve 202a within the cavity, there can be minimal flow resistance, resulting in minimal pressure drop. When the valve 202a is in the open position, the fluid heating device 100 can be operating normally without any indications of a leak. If the fluid heating device 100 begins to leak, liquid can accumulate proximate the fluid heating device 100. The trigger 206 can be positioned such that the trigger 206 can interact with leaked liquid, resulting in the trigger 206 at least partially dissolving and/or physically changing. Upon the trigger 206 at least partially dissolving, the actuating system 204 can be activated and the valve 202a can transition to the closed position. In the closed position, the passage of liquid through the inlet pipe 102 can be at least partially restricted and/or entirely blocked.

Although FIGS. 2C-2F illustrate an actuating system 204 including a stem 212 extending from the gate valve 202a and a spring 214 in communication with the stem 212, it is contemplated that alternative actuating systems can be used in conjunction with the gate valve 202a. By way of example, the actuating system 204 can include a spring-loaded latch and a flap. The spring-loaded latch can be in communication with the trigger 206. When the trigger 206 interacts with liquid, the trigger 206 can at least partially dissolve and/or physically change, activating the actuating system 204. The flap can be released. The flap can be sized such that the flap can prevent the passage of liquid through the fluid heating device 100. The flap can have a length that is approximately the same as the diameter of the inlet pipe 102. The flow of liquid through the inlet pipe 102 can create sufficient pressure to maintain the flap in the closed position.

Figure 3A:
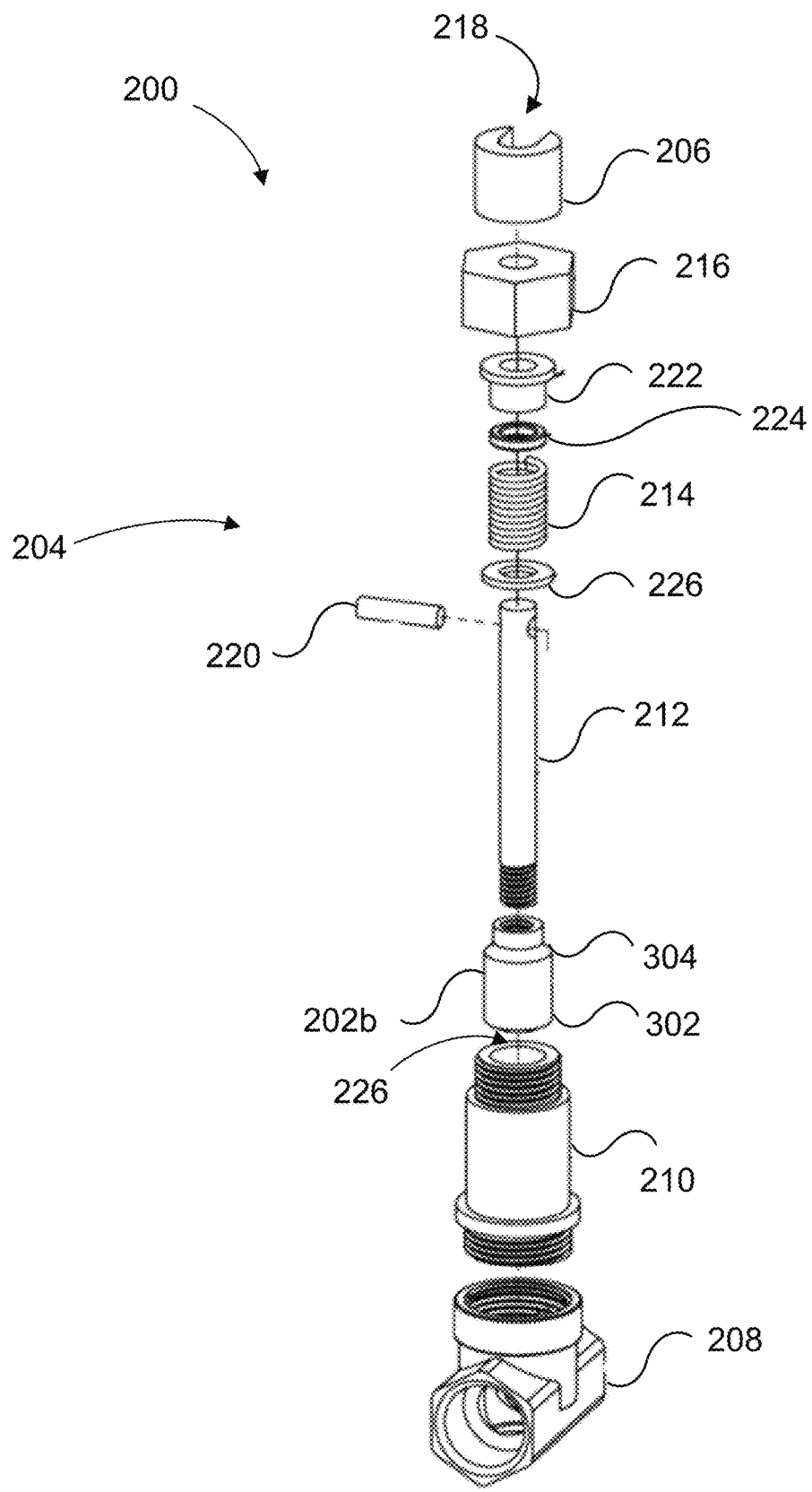
FIG. 3A illustrates an exploded view of an example valve assembly, in accordance with the disclosed technology.

FIGS. 3A-3E illustrate an additional example valve assembly 200 including a needle valve 202b. FIG. 3A illustrates an exploded view of the additional example valve assembly 200 including the needle valve 202b. The valve assembly 200 can include the needle valve 202b, an actuating system 204, and a trigger 206. The valve 202b can be configured to transition from an open position to a closed position when the actuating system 204 becomes activated upon the trigger 206 dissolving and/or physically changing due to interaction with liquid from a potential leak in the fluid heating device 100.

The valve 202b can be configured to effectively restrict the passage of fluid through the fluid heating device 100 upon the detection of a leak. The valve 202b can have a first end 302 and a second end 304. The first end 302 can be tapered, such that the valve 202b can have a substantially conical shape. The seat 208 can have a corresponding tapered shape such that the first end 302 and the seat 208 can fit together when the valve 202b is in the closed position. The valve 202b can have a cross-section having a diameter that is substantially the same as the diameter of the inlet pipe 102 such that the passage of liquid through the inlet pipe 102 can be blocked when the valve 202b is in the closed position.

The valve 202b can be made of any material capable of effectively minimizing or preventing the passage of water. The valve 202a can be made of material including cast iron, carbon steel, stainless steel, cooper, plastic, or combinations thereof.

The valve assembly 200 can include the actuating system 204 and the trigger 206, as described in FIGS. 2A through 2F. The valve assembly 200 including the valve 202b can include the same or substantially the same components as the valve assembly described in FIGS. 2A through 2F.

Figures 3B, 3C:
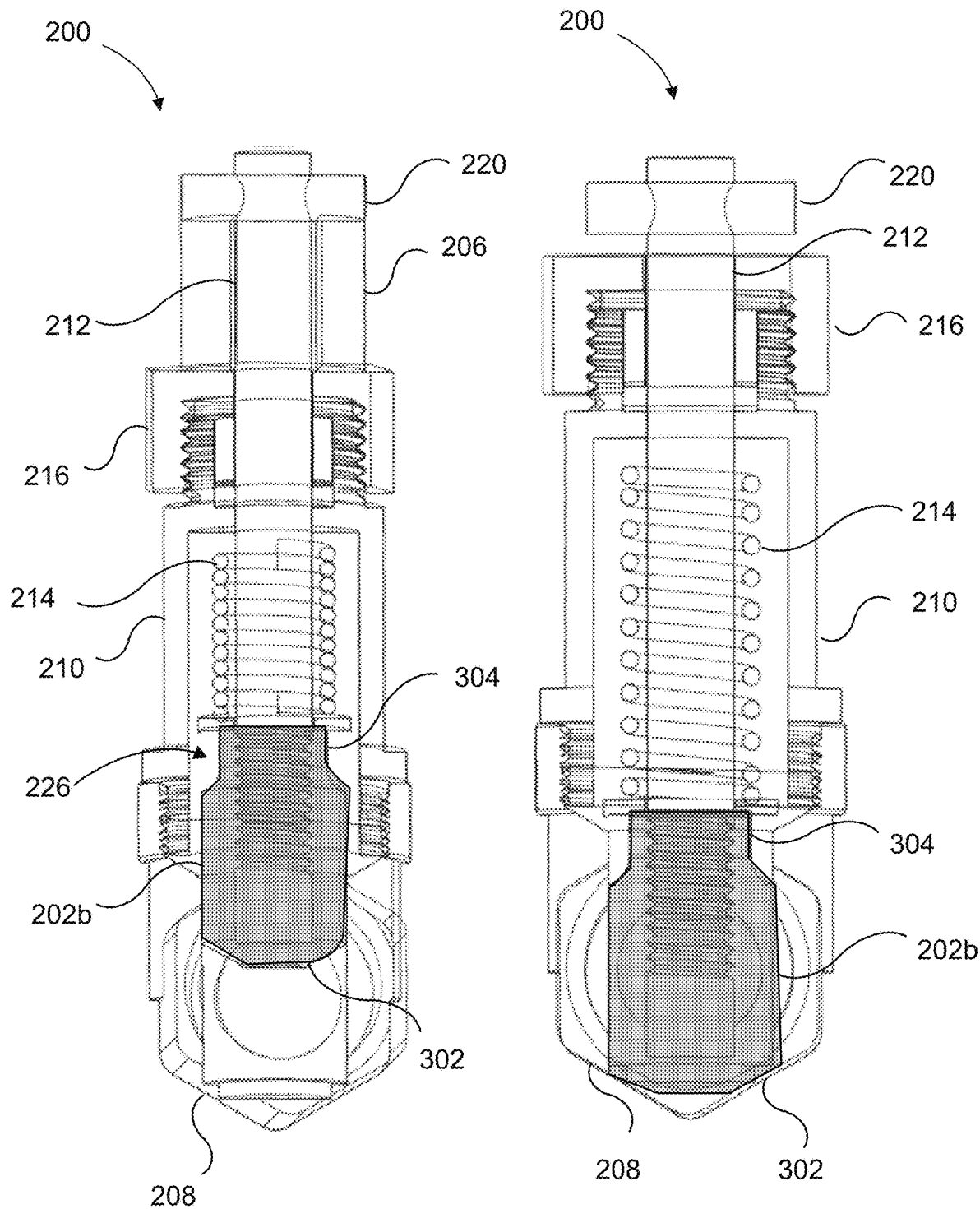
FIG. 3B illustrates a cross-sectional side view of the example valve assembly of FIG. 3A in an open position, in accordance with the disclosed technology.
FIG. 3C illustrates a cross-sectional side view of the example valve assembly of FIG. 3A in a closed position, in accordance with the disclosed technology.

FIGS. 3B and 3C illustrate a cross-sectional side view of the example valve assembly 200 including the valve 202b transitioning from an open position to a closed position. In the open position, the valve 202b can be disposed within the cavity 226 of the valve body 210. The valve 202b can be disposed within the cavity 226 such that the passage of liquid through the fluid heating device 100 is unobstructed, resulting in minimal flow resistance. In some instances, when the valve 202b is in the open position, the valve 202b can be disposed within the cavity 226 such that a portion of the flow of liquid through the inlet 102 can be directed towards the valve 202b. In this configuration, when the valve 202b is in the open position, the flow of liquid through the inlet 102 can be nonlinear, in that a portion of the flow of liquid can be directed towards the first end 302 of the valve 202b.

In the open position, the spring 214 can be wrapped or coiled around the stem 212 extending from the valve 202b and can be in a compressed configuration. The trigger 206 can be positioned on a top surface of the seal 216. The trigger 206 can receive at least a portion of the stem 212, such that in the open position, the trigger 206 can be in mechanical communication with the stem 212. The pin 220 inserted through an aperture of the stem 212 can rest on the top surface of the trigger 206. The presence of the trigger 206 can hold the valve 202b in the open position. The trigger 206 can serve as a visual indication that the valve 202b is in the open position.

In the closed position, the first end 302 of the valve 202b can be inserted into the seat 208. The corresponding tapered shape of the first end 302 and the seat 208 can allow the valve 202b to effectively restrict and/or prevent the passage of liquid through the fluid heating device 100. The actuating system 204 can be activated and operable to close the valve 202b using substantially the same mechanism as described with reference to FIGS. 2C through 2F.

Figure 3D:
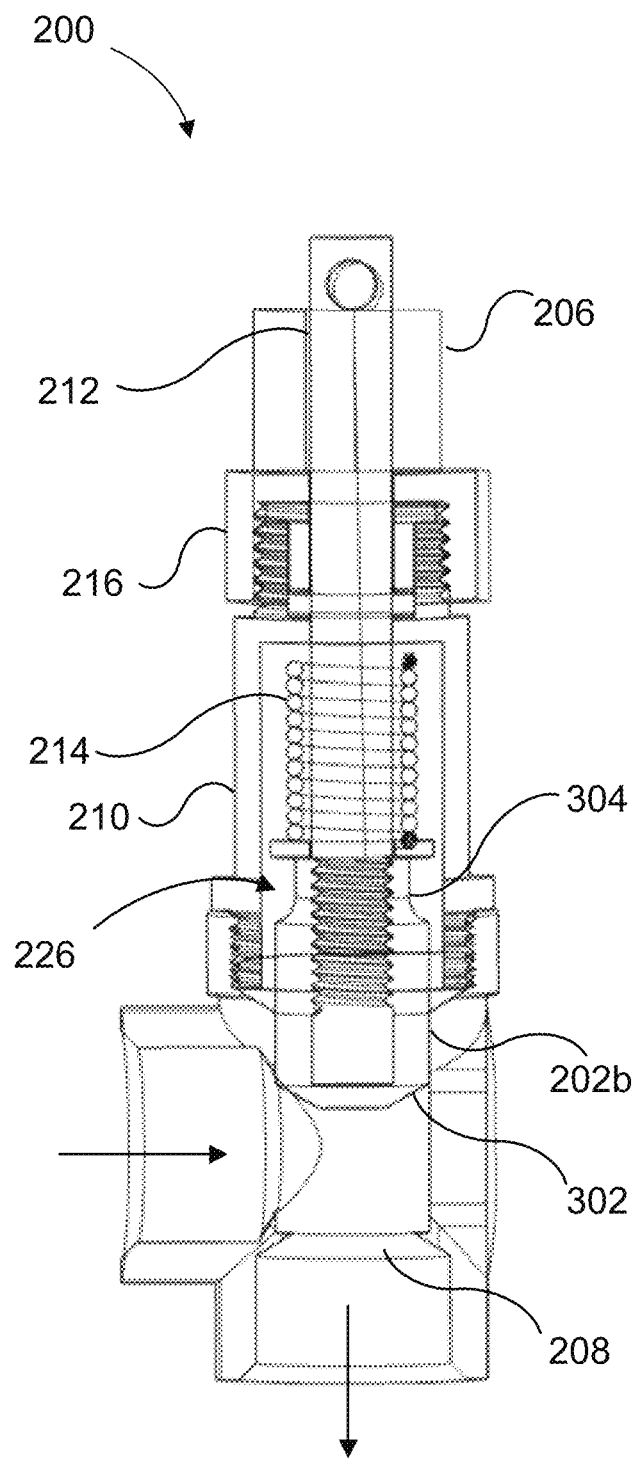
FIG. 3D illustrates a cross-sectional front view of the example valve assembly of FIG. 3A in an open position, in accordance with the disclosed technology.
Figure 3E:
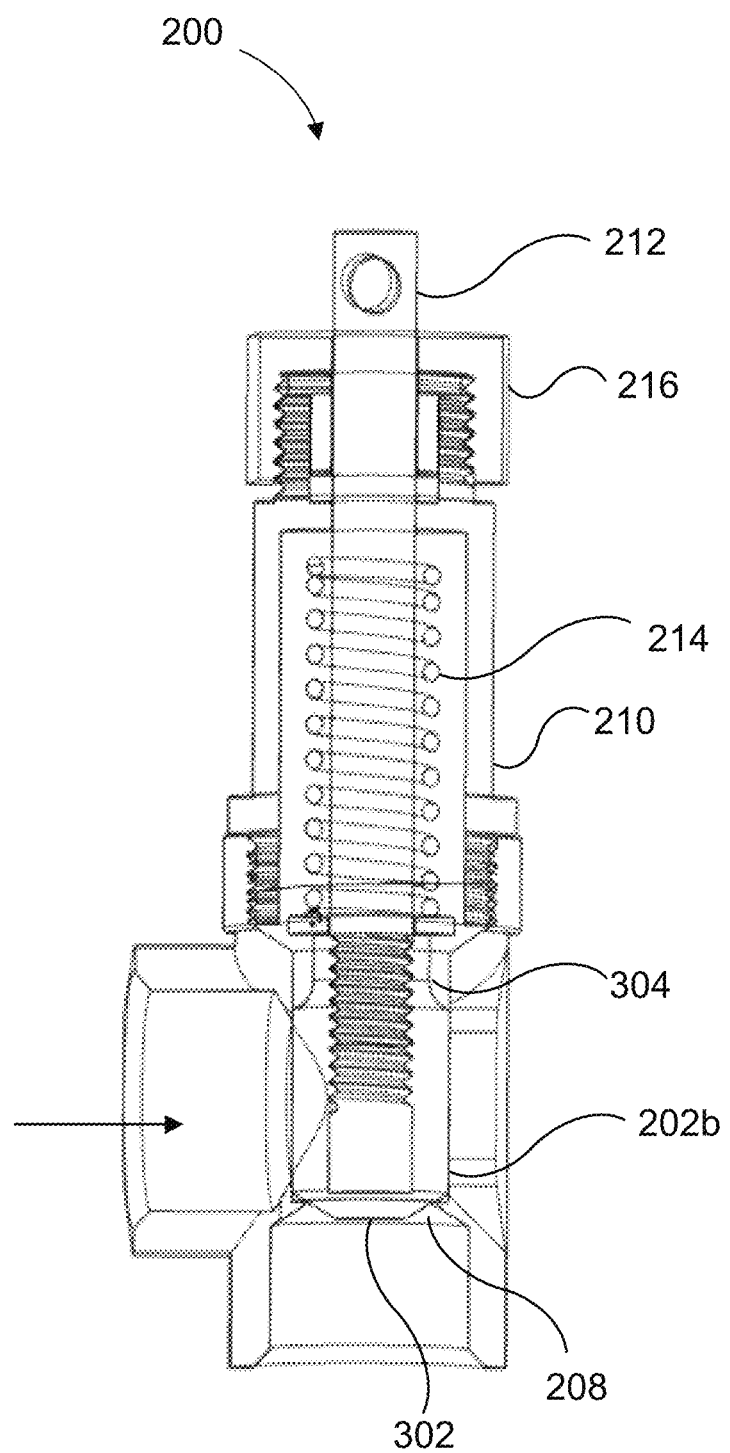
FIG. 3E illustrates a cross-sectional front view of the example valve assembly of FIG. 3A in a closed position, in accordance with the disclosed technology.

FIGS. 3D and 3E illustrate a cross-sectional front view of the example valve assembly 200 including the valve 202b transitioning from an open position to a closed position. As illustrated in FIG. 3D, the passage of liquid flowing through to the fluid heating device 100 can be directed at approximately a ninety-degree angle. In this configuration, the valve assembly 200 including the valve 202b can operate in substantially the same manner as described and illustrated in FIGS. 3B and 3C. In the open position, the passage of liquid can be substantially unobstructed, as the valve 202b can be disposed within the cavity 226 of the valve body 210. Upon the actuating system 204 being activated, the valve 202b can transition from the open position to the closed position. The valve 202b can be received into the seat 208, and the passage of liquid flowing through the inlet pipe 102 and to the fluid heating device 100 can be restricted and/or entirely blocked.

FIGS. 4A and 4B illustrate a cross-sectional side view of the example valve assembly 200 including a partition valve 202c transitioning from an open position to a closed position. The valve 202c can include a first end 402 and a second end 404. In the open position, the valve 202c can be disposed within the cavity 226 of the valve body 210 such that the passage of liquid through the fluid heating device 100 can be unobstructed, resulting in minimal flow resistance and pressure drop.

The actuating system 204 can include the same or substantially the same components as discussed with reference to FIGS. 2A through 3E and further can be activated and operable to close the valve 202c using substantially the same mechanism as described with reference to FIGS. 2A through 3E. In the closed position, the valve 202c can block only a portion of the passage of liquid through the fluid heating device 100. In some instances, less than half of the passage can be blocked by the valve 202c. Alternatively, in some instances, more than half of the passage can be blocked by the valve 202c. When the valve 202c transitions to the closed position, the first end 402 of the valve 202c does not drop into the seat 208.

In FIGS. 2A-4B, the valve assembly 200 includes a trigger 206 that is liquid soluble, such that upon interaction with liquid from a leak, the trigger 206 can at least partially dissolves. When the trigger 206 at least partially dissolves, the trigger 206 can structurally fail. When the trigger 206 structurally fails, the actuating system 204 can be activated, and then valve 202a, 202b, 202c can move from the open position to the closed position. Upon detecting the leak, the leak can be properly serviced. After properly servicing the leak, the actuating system 204 can be reset and the trigger 206 can be replaced with a second trigger such that additional future leaks can be detected. The actuating system 204 can be reset by pulling the stem 212 of the actuating system 204 upwards, such that the second trigger can be positioned in mechanical communication with the stem 212 of the actuating system 204. The second trigger can have an opening configured to receive the stem 212. When the second trigger is positioned in mechanical communication with the stem 212, the strength of the second trigger can cause the spring 214 of the actuating system 204 to re-compress. In this configuration, the valve assembly 200 can detect and prevent an additional future leak.

FIG. 5 illustrates a schematic diagram of the valve assembly 200 having a diaphragm valve 202d and an alternative actuating system 204. Although FIG. 5 illustrates a diaphragm valve 202d, it is contemplated that any valve 202 can be used in conjunction with the alternative actuating system 204.

As illustrated in FIG. 5, the valve 202d can have a substantially dome shape or a substantially frustoconical shape. The substantially dome or frustoconical shape of the valve 202d can correspond to the shape of the seat 208, such that in the in the closed position the seat 208 can receive the first end 502. The valve 202d can be made of any material capable of restricting and/or blocking a passage of liquid through the fluid heating device 100. By way of example, the valve 202d can be made of metal, alloys, elastomeric material, and/or the like.

The actuating system 204 can include a spring 214 in communication with a stem 212 of the valve 202d and a lever 506. The stem 212 can extend from the second end 504 of the valve 202d and through the cavity 226 of the valve body 210. The stem 212 can be integral to the valve 202d. Alternatively, the stem 212 can be a separate component that can affixed to the second end 504 of the valve 202d. The spring 214 can be wrapped or coiled around at least a portion of the stem 212. In some instances, the spring 214 can be wrapped or coiled around the entire length of the stem 212. The spring 214 can be configured to move from a compressed configuration to an elongated configuration, upon activation of the actuating system 204. The stem 212 further extend through an end wall of the valve body 210 and through a seal 216 can be positioned proximate the end wall of the valve body 210. The lever 506 can include a first end 508 and a second end 510. The first end 508 of the lever 506 can be in mechanical communication with the stem 212. The second end 510 of the lever 506 can be in mechanical communication with the trigger 206. The trigger 206 can be positioned to interact with liquid that has leaked from the fluid heating device 100. Upon the trigger 206 interacting with liquid, the trigger 206 can transition from a dry state to a hydrated state and accordingly expand in volume. When the trigger 206 expands in volume, the lever 506 can rotate upward from a first position to a second position. The first position can correspond to an axis on which the trigger 206 is disposed. The second position can correspond to the threshold angle at which the actuated system 204 can be activated. In some instances, the lever 506 can rotate from the first position to the second position upon the trigger 206 expanding to a threshold volume, activating the actuating system. Alternatively, the lever 506 can gradually rotate from the first position to the second position as the trigger 206 expands in volume. In this configuration, the actuating system 204 does not become activated at a threshold angle of rotation and instead, the valve 202d is gradually received by the seat 208 as the spring 214 moves from the compressed configuration to the elongated configuration and the stem linearly moves in the direction of the seat 208.

When the valve 202d transitions to the closed position, a seat 208 can receive the valve 202d. The seat 208 can be shaped to receive the first end 502 of the valve 202d. By way of example, as illustrated in FIG. 5, the first end 502 of the valve 202d and the seat 208 can both be similarly tapered. The corresponding shape of the seat 220 and valve 202d can facilitate restricting and/or blocking the passage of liquid through the fluid heating device 100.

Once the trigger 206 has expanded due to the presence of liquid, thereby causing the actuating system 204 to close the valve 202, the leak can be properly serviced. Upon servicing the leak, the actuating system 204 can be reset by rotating the lever downwards. When the lever 506 is rotated downwards, the spring 214 can become re-compressed. The second end 510 of the lever 506 can be positioned in mechanical communication with the second trigger. In this configuration, the valve assembly 200 can detect and prevent an additional future leak.

Figure 6:
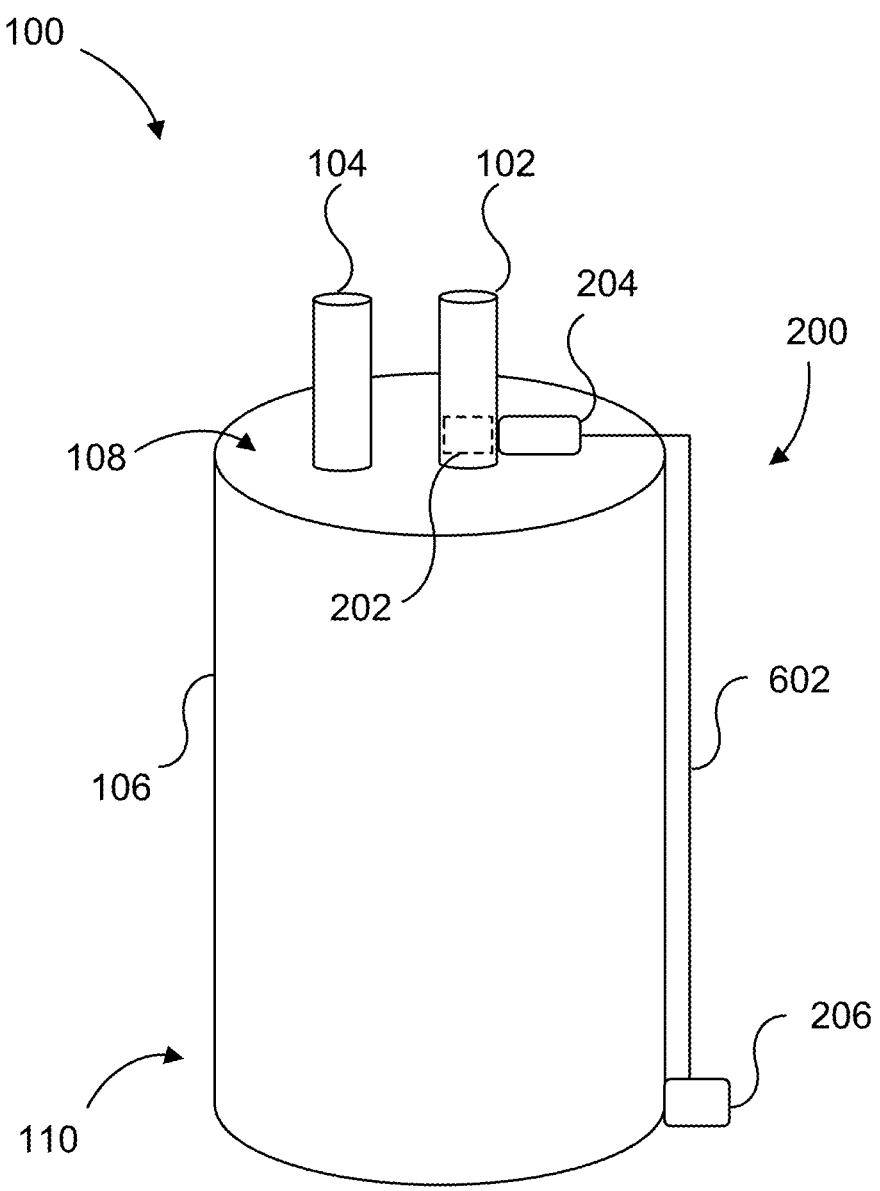
FIG. 6 illustrates an example valve assembly having a trigger that is positioned remotely from an actuating system of the example valve assembly, in accordance with the disclosed technology.

FIG. 6 illustrates a fluid heating device 100 in communication with the valve assembly 200. In FIG. 6, the trigger 206 can be positioned at a first location and the actuating system 204 can be positioned at a second location, the second location being different than the first location. The trigger 206 can be positioned proximate to the base 110 of the fluid heating device 100. The trigger 206 can be positioned on the ground at which the fluid heating device 100 is disposed on. The actuating system 204 can be positioned proximate a top surface 108 of the fluid heating device 100. The actuating system 204 can be positioned proximate the inlet pipe 102. The actuating system and the valve 202 can be in fluid communication with the inlet pipe 102 such that when the valve 202 transitions to the closed position, the passage of fluid through the inlet pipe 102 can be restricted. A connector 602 can extend from the trigger to the actuating system 202 such that the trigger 206 and the actuating system 204 are in mechanical communication. The connector 602 can be a rigid member or a non-rigid member (e.g. a pole, a rod, a wire, a cable, a tether, or the like) capable of transferring energy from the trigger 206 to the actuating system 204 such that when the trigger 206 transitions from the dry state to the hydrated state, the valve 202 moves from the open position to the closed position. Upon the presence of a liquid leak, the trigger 206 can at least partially dissolve. Alternatively, upon the presence of water, the trigger 206 can at least partially expand. As the trigger 206 transitions from the dry state to the hydrated state, the actuating system 204 can become activated. By way of example, when the trigger 206 at least partially dissolves, the connector 602 can drop a threshold distance, causing the actuating system 204 to be activated. Alternatively, when the trigger 206 at least partially expands, the connector 602 can rise a threshold distance, causing the actuating system 204 to be activated. When the actuating system 204 is activated, the valve 202 can transition from the open position to the closed position, restricting the passage of liquid through the fluid heating device 100. By closing the valve 202, the leak can be stopped, resulting in minimal water damage.

As illustrated in FIGS. 2A through 6, appropriately positioning the valve 202, the actuating system 204, and the trigger 206, such that the actuating system is in mechanical communication with the trigger 206 and valve 202 and the valve 202 is in mechanical communication with the actuating system 204, allows the valve 202 to be effectively closed without the use of power. In this configuration, sensors configured to detect a leak and accordingly send a signal to a controller to accordingly send instructions to a valve to close are not necessary. By using mechanical communication instead of electrical communication, the valve 202 can remain fully operable in instances where no power is available and when a device has failed due to a leak.

FIGS. 2A through 6 illustrate a valve assembly 200 including various example valves 202, actuating systems 204, and triggers 206. Although particular example valves 202 are disclosed, it is contemplated that any valve configured to transition from an open position to a closed position can be used. Although actuating systems 204 with particular components are disclosed, it is contemplated that any actuating system configured to be in mechanical communication with the valve 202 and trigger 206 such that when activated, the valve 202 can transition to the closed position, can be used. Although a liquid soluble and liquid expandable trigger 206 are disclosed, it is contemplated that any trigger 206 configured to activate the actuating system can be used.

Certain examples and implementations of the disclosed technology are described above with reference to block and flow diagrams according to examples of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams do not necessarily need to be performed in the order presented, can be repeated, or do not necessarily need to be performed at all, according to some examples or implementations of the disclosed technology. It is also to be understood that the mention of one or more method steps does not preclude the presence of additional method steps or intervening method steps between those steps expressly identified. Additionally, method steps from one process flow diagram or block diagram can be combined with method steps from another process diagram or block diagram. These combinations and/or modifications are contemplated herein.

What is claimed is:

1. A valve assembly for detecting and mitigating a liquid leak comprising:
  a valve having an open position and a closed position, the valve being configured to permit unobstructed passage of liquid through a straight plumbing assembly when the valve is in the open position, to partially restrict passage of liquid through the straight plumbing assembly when the valve is between the open position and the closed position, and to restrict passage of the liquid through the plumbing assembly when the valve is in the closed position;
  a seat configured to receive the valve in the closed position, wherein the seat has a shape corresponding to a shape of the valve such that the valve can fit into the seat and the passage of the liquid can be restricted;
  a valve stem extending linearly from the valve;
  a trigger configured to transition from a dry state to a hydrated state in response to interacting with a leaked liquid, wherein the trigger includes an opening that receives a portion of the valve stem and blocks movement of the valve such that the valve is maintained in the open position in the dry state, and a component of the trigger at least partially dissolves in response to interacting with the leaked liquid; and
  an actuating system including a spring substantially coiled around the valve stem, the actuating system being in mechanical communication with the valve and the trigger, wherein (i) in response to the component of the trigger at least partially dissolving and the trigger transitioning to the hydrated state, the trigger structurally fails causing the trigger to unblock movement of the valve, and (ii) in response to the trigger unblocking movement of the valve, the spring transitions from a compressed state to an elongated state, thereby causing the valve to move a linear distance to transition from the open position to the closed position,
  wherein the valve assembly is configured so that the trigger is positionable such that the trigger can interact with the leaked liquid, and
  wherein the valve assembly intersects the straight plumbing assembly at a right angle.

2. The valve assembly of claim 1, wherein the valve comprises a gate valve.

3. The valve assembly of claim 1, wherein the valve includes a needle valve.

4. The valve assembly of claim 1, wherein the valve includes a diaphragm valve.

5. The valve assembly of claim 1, wherein the spring stores potential energy to transition the valve from the open position to the closed position.

6. The valve assembly of claim 1, wherein:
  in the dry state the trigger is configured to retain the spring in the compressed state, and
  in the hydrated state, the trigger is configured to release the spring such that the actuating system transitions the valve from the open position to the closed position.

7. The valve assembly of claim 1, wherein the trigger is a first trigger, the valve assembly being configured to at least partially receive the first trigger and at least partially receive a second trigger subsequent to the first trigger transitioning to the hydrated state.

8. The valve assembly of claim 1, wherein the component of the trigger comprises polyvinyl alcohol.

9. The valve assembly of claim 1, wherein the component of the trigger comprises a liquid soluble material selected from a group consisting of polyvinyl alcohol, calcium, salt, sugar, paper, and combinations thereof.

10. The valve assembly of claim 1, wherein restricting passage of the liquid is achieved by a blockage consisting of the valve and the seat.

11. A water heater comprising:
a straight inlet pipe for receiving a flow of water;
a valve assembly in fluid communication with the inlet pipe, the valve assembly including:
a valve having an open position and a closed position, the valve being configured to permit unobstructed passage of water through the water heater when the valve is in the open position, to partially restrict passage of liquid through the straight plumbing assembly when the valve is between the open position and the closed position, and to restrict the passage of water through the water heater when the valve is in the closed position;
a seat configured to receive the valve in the closed position, wherein the seat has a shape corresponding to a shape of the valve such that the valve can fit into the seat and the passage of the water can be restricted;
a valve stem extending linearly from the valve;
a trigger configured to transition from a dry state to a hydrated state in response to interacting with leaked water, wherein the trigger includes an opening that receives a portion of the valve stem and blocks movement of the valve such that the valve is maintained in the open position in the dry state, and a component of the trigger at least partially dissolves in response to interacting with the leaked water; and
an actuating system including a spring substantially coiled around the valve stem, the actuating system being in mechanical communication with the valve and the trigger, wherein (i) in response to the component of the trigger at least partially dissolving and the trigger transitioning to the hydrated state, the trigger structurally fails causing the trigger to unblock movement of the valve, and (ii) in response to the trigger unblocking movement of the valve, the spring transitions from a compressed state to an elongated state, thereby causing the valve to move a linear distance to transition from the open position to the closed position,
wherein the valve assembly is configured so that the trigger is positionable such that the trigger can interact with the leaked water, and
wherein the valve assembly intersects the straight inlet pipe at a right angle.

12. The water heater of claim 11, wherein the valve assembly includes a body having a cavity, the cavity configured to intersect with the inlet pipe.

13. The water heater of claim 11, wherein the actuating system and the trigger are disposed proximate to the inlet pipe.

14. The water heater of claim 11, further comprising a dry contact switch configured to move from an open state to a closed state, the closed state interrupting a supply of electrical power to the water heater.

15. The water heater of claim 11, where the component of the trigger comprises polyvinyl alcohol.

16. The water heater of claim 11, wherein the component of the trigger comprises a liquid soluble material selected from a group consisting of polyvinyl alcohol, calcium, salt, sugar, paper, and combinations thereof.

17. The water heater of claim 11, wherein in the dry state the component of the trigger is configured to maintain a structural integrity of the trigger.

* * * * *